United States Patent
Shyu

(10) Patent No.: US 6,453,332 B1
(45) Date of Patent: Sep. 17, 2002

(54) METHOD AND APPARATUS FOR PERFORMING PLURAL MATRIX MULTIPLICATION OPERATIONS

(75) Inventor: Rong-Fuh Shyu, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/378,041

(22) Filed: Aug. 20, 1999

(51) Int. Cl.$^7$ ................................................. G06F 17/16
(52) U.S. Cl. ...................................... 708/607; 708/620
(58) Field of Search .............................. 708/607, 620, 708/623, 624, 625

(56) References Cited

U.S. PATENT DOCUMENTS

| | | | | |
|---|---|---|---|---|
| 5,255,216 A | * | 10/1993 | Blanz et al. | ............... 708/620 |
| 5,617,346 A | * | 4/1997 | Inoue | ............... 708/625 |
| 5,715,187 A | * | 2/1998 | Chen et al. | ............... 708/620 |
| 5,737,257 A | * | 4/1998 | Chen et al. | ............... 708/625 |
| 6,101,522 A | * | 8/2000 | Sato | ............... 708/620 |
| 6,219,375 B1 | * | 4/2001 | Dent | ............... 708/620 |

* cited by examiner

*Primary Examiner*—David H. Malzahn
(74) *Attorney, Agent, or Firm*—Christensen O'Connor Johnson Kindness PLLC

(57) ABSTRACT

In a method and apparatus for performing plural matrix multiplication operations that involve a variable (X) and two coefficients (a), (b), each entry of a look-up table is constructed to correspond to a value of the variable (X) and to have first and second data fields that store coded products associated with the coefficients (a), (b). When the variable (X) is used to address the look-up table, the coded products in the first and second data fields of an addressed one of the entries are generated at first and second outputs of the look-up table, respectively. A decoder processes the coded products from the first and second outputs of the look-up tables, such as by performing arithmetic combining operations, to obtain the results of the matrix multiplication operations.

12 Claims, 7 Drawing Sheets

METHOD AND APPARATUS FOR PERFORMING PLURAL MATRIX MULTIPLICATION OPERATIONS

BACKGROUND OF THE INVENTION

1. Field of the Invention

The invention relates to a method and apparatus for performing matrix multiplication operations, more particularly to a method and apparatus for performing plural matrix multiplication operations.

2. Description of the Related Art

Matrix multiplication is frequently needed in a digital signal-processing device. For example, the functions of color space conversion and discrete cosine transform (DCT) in digital video processing involve matrix multiplication of one domain with a corresponding common scaler to obtain converted or transformed results of another domain. Conventionally, matrix multiplication is commonly implemented using multipliers or look-up tables. The look-up table approach is often preferred because it involves less complexity.

While the prior art has taught that matrix multiplication can be implemented using look-up table techniques, there is still room for improvement. Particularly, it is preferable to devise a way of implementing the look-up table technique to conduct plural matrix multiplication operations efficiently.

SUMMARY OF THE INVENTION

Therefore, the object of the present invention is to provide an efficient method and apparatus for performing plural matrix multiplication operations using reduced look-up tables.

According to the present invention, a method and apparatus are provided for performing plural matrix multiplication operations. A first one of the matrix multiplication operations is performed to obtain a product of a first coefficient (a) and a first variable (X). A second one of the matrix multiplication operations is performed to obtain a product of a second coefficient (b) and the first variable (X). In the method and apparatus of this invention, a look-up table having a plurality of entries is constructed such that each of the entries corresponds to a value of the first variable (X) and has first and second data fields that store coded products associated with the coefficients (a), (b). When the first variable (X) is provided to the look-up table to address a corresponding one of the entries, the coded product in the first data field of the corresponding one of the entries is generated at a first output of the look-up table, while the coded product in the second data field of the corresponding one of the entries is generated at a second output of the look-up table. A decoder processes the coded products from the first and second outputs of the look-up table, such as by performing arithmetic combining operations, to obtain the results of the matrix multiplication operations.

In a preferred embodiment, a DPCM coding scheme is applied to reduce the size of the look-up table such that the first data field stores the product of the corresponding value of the first variable (X) and the first coefficient (a), while the second data field stores the product of the corresponding value of the first variable (X) and a differential coefficient (b−$2^m$a), where m is an integer. The result of the first one of the matrix multiplication operations is obtained from the first output of the look-up table when the first variable (X) is used to address the look-up table. The decoder combines the products at the first and second outputs of the look-up table to obtain the result of the second one of the matrix multiplication operations when the first variable (X) is used to address the look-up table.

In another preferred embodiment, a binary polynomial approximation coding scheme is applied to reduce the size of the look-up table such that the first data field stores the product of the corresponding value of the first variable (X) and a third coefficient (r), while the second data field stores the product of the corresponding value of the first variable (X) and a fourth coefficient (c), where a=r*$2^m$+c and b=r*$2^n$, and m and n are integers.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
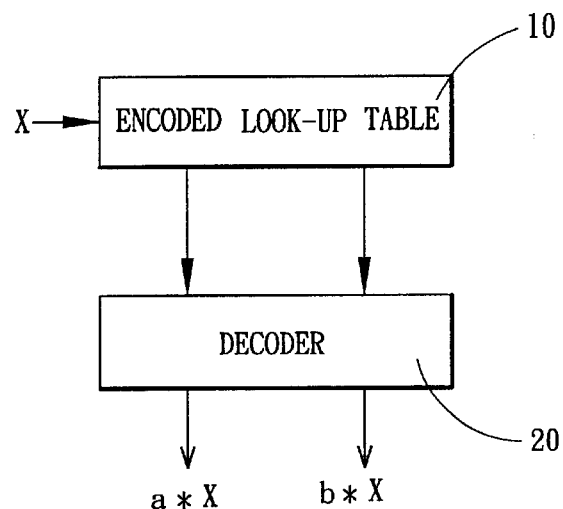
FIG. 1 is a block diagram illustrating an apparatus for performing two matrix multiplication operations associated with a common variable (X) according to the present invention.

Referring to FIG. 1, according to the present invention, a look-up table 10 and a decoder 20 are used to implement two matrix multiplication operations associated with a common variable (X). The matrix multiplication operations are a*X and b*X, respectively. (a) and (b) are constants. The look-up table 10 stores coded products associated with the constants (a) and (b), which are calculated in advance using all possible values of the variable (X). Each time a value of the variable (X) addresses the look-up table 10, corresponding coded products are generated at outputs of the look-up table 10. The decoder 20 receives the coded products, and decodes the same according to the coding algorithm applied to the look-up table 10 to obtain the products for the two matrix multiplication operations, a*X and b*X. The effect of the coding algorithm is to reduce the required bit size of the look-up table 10. This will be described in greater detail in the succeeding paragraphs.

Figure 2:
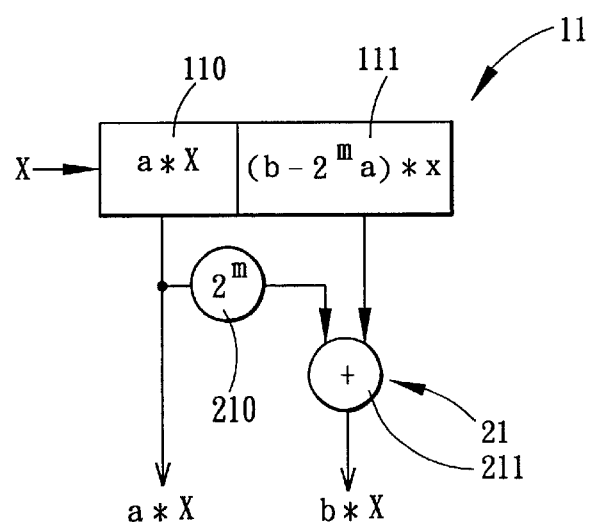
FIG. 2 is a block diagram illustrating the first preferred embodiment of an apparatus for performing plural matrix multiplication operations according to the present invention.

FIG. 2 illustrates the first preferred embodiment of the present invention. In this embodiment, a DPCM coding scheme is applied to reduce the size of the look-up table 11. The look-up table 11 has a plurality of entries, each of which corresponds to a value of the variable (X) and has a first data field 110 for storing the product of the corresponding value of the variable (X) and the constant (a), and a second data field 111 for storing the product of the corresponding value of the variable (X) and a differential coefficient (b−$2^m$a), where (m) is an integer. The look-up table 11 further has a first output to provide the product in the first data field of an addressed one of the entries, and a second output to provide the product in the second data field of the addressed one of the entries, when the look-up table 11 is addressed by the variable (X). The decoder 21 includes a shifter 210 connected to the first output of the look-up table 11, and an adder 211 connected to the shifter 210 and the second output of the look-up table 11 for obtaining the result for the matrix multiplication operation b*X. The shifter 210 shifts the result of the matrix multiplication operation a*X from the first output of the look-up table 11 by (m) bits, and provides the shifted result to the adder 211. The adder 211 adds the shifted result from the shifter 210 to the addressed differential result (b−$2^m$a)*X from the second output of the look-up table 11 to obtain the result of the matrix multiplication operation b*X. If m=0, the shifter 210 is not needed since the coding algorithm simply involves an ordinary difference between the results of the matrix multiplication operations a*X, b*X for the same value of the variable (X).

Figure 3:
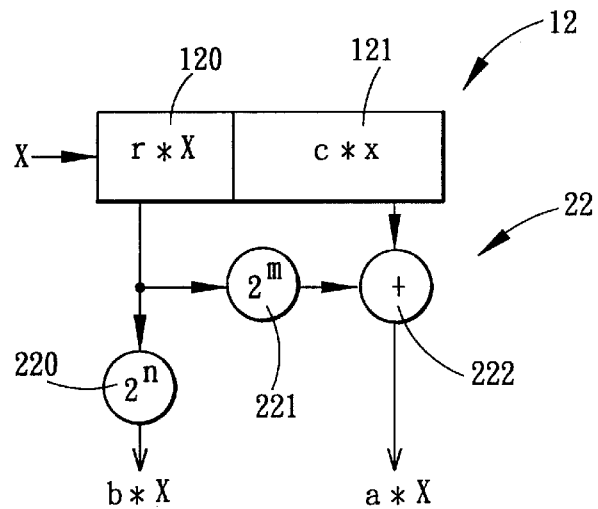
FIG. 3 is a block diagram illustrating the second preferred embodiment of an apparatus for performing plural matrix multiplication operations according to the present invention.

FIG. 3 illustrates the second preferred embodiment of the present invention. In this embodiment, a binary polynomial approximation coding scheme is applied to reduce the size of the look-up table 12. An appropriate value (r) is chosen such that the constants (a), (b) can be estimated using a binary polynomial with a coefficient (r). For example, the constant (a) can be expanded to r*$2^m$+c, while the constant (b) can be expanded to r*$2^n$+d, where (m) and (n) are integers, and (c) and (d) are compensating remainders. It is further preferred that one of the compensating remainders, such as (d), is fixed at zero so that the look-up table 12 can be simplified to involve only (r) and the other one of the compensating remainders, such as (c). In the embodiment of FIG. 3, the look-up table 12 has a plurality of entries, each of which corresponds to a value of the variable (X) and has a first data field 120 for storing the product of the corresponding value of the variable (X) and the coefficient (r), and a second data field 121 for storing the product of the corresponding value of the variable (X) and the coefficient (c). The first output of the look-up table 12 provides the product in the first data field of an addressed one of the entries, and the second output of the look-up table 12 provides the product in the second data field of the addressed one of the entries, when the look-up table 12 is addressed by the variable (X) The decoder 22 includes first and second shifters 220, 221 connected to the first output of the look-up table 12, and an adder 222 connected to the second shifter 221 and the second output of the look-up table 12. The first shifter 220 shifts the product at the first output of the look-up table 12 by (n) bits to obtain the result of the matrix multiplication operation b*X. The second shifter 221 shifts the product at the first output of the look-up table 12 by (m) bits, and provides the shifted result to the adder 222. The adder 222 adds the shifted result from the second shifter 221 to the product at the second output of the look-up table 12 to obtain the result of the matrix multiplication operation a*X.

The following example is used to illustrate the advantages that result from the coding methods employed in the embodiments of FIGS. 2 and 3. Assuming that a=2.9 and b=1.4, if the variable (X) is an 8-bit vector ranging from 0 to 255, then the product of the matrix multiplication operation a*X will range from 0 to 739.5, which requires up to 10 bits to represent the same, whereas the product of the matrix multiplication operation b*X will range from 0 to 357, which requires up to 9 bits to represent the same. Thus, a total of 19 bits is needed to represent the results of the matrix multiplication operations a*X and b*X in a look-up table when no coding scheme is employed.

Using the DPCM coding scheme of the embodiment of FIG. 2, the look-up table is set-up such that the entries thereof store a corresponding product of the matrix multiplication operation b*X in the first data field, which product requires a smaller number of bits to represent the same as compared to the product of the matrix multiplication operation a*X. The differential coefficient is chosen to be (2.9−2*1.4) or 0.1. The result of the matrix multiplication operation 0.1*X ranges from 0 to 25.5, which requires only 5 bits to represent the same. Thus, only a total of 14 bits is needed to represent the products of the matrix multiplication operations 1.4*X and 0.1*X in the look-up table for the above example when the DPCM coding scheme is in use. The decoder includes a shifter for left-shift of the result of the matrix multiplication operation 1.4*X by 1 bit, and an adder for adding the shifted result 2.8*X from the shifter to the result of the matrix multiplication operation 0.1*X from the look-up table to obtain the result of the matrix multiplication operation 2.9*X.

Using the binary polynomial approximation coding scheme of the embodiment of FIG. 3, the coefficient (r) is chosen to be 0.35 such that the constant (a) is expanded to 0.35*$2^3$+0.1, while the constant (b) is expanded to 0.35*$2^2$, where m=3, n=2 and c=0.1. Thus, the result of the matrix multiplication operation r*X ranges from 0 to 89.25, which requires up to 7 bits to represent the same, while the result of the matrix multiplication operation c*X ranges from 0 to 25.5, which requires up to 5 bits to represent the same. As such, only a total of 12 bits is needed to represent the results of the matrix multiplication operations 0.35*X and 0.1*X in the look-up table for the above example when the binary polynomial approximation coding scheme is in use. The decoder includes a first shifter for left-shift of the result of the matrix multiplication operation 0.35*X by 2 bits to obtain the result of the matrix multiplication operation 1.4*X, a second shifter for left-shift of the result of the matrix multiplication operation 0.35*X by 3 bits, and an adder for adding the shifted result 2.8*X from the second shifter to the result of the matrix multiplication operation 0.1*X from the look-up table to obtain the result of the matrix multiplication operation 2.9*X.

It has thus been shown that, by applying a coding algorithm to the look-up table, the efficiency in usage of the look-up table can be increased, and the required size of the look-up table can be reduced.

Figure 4:
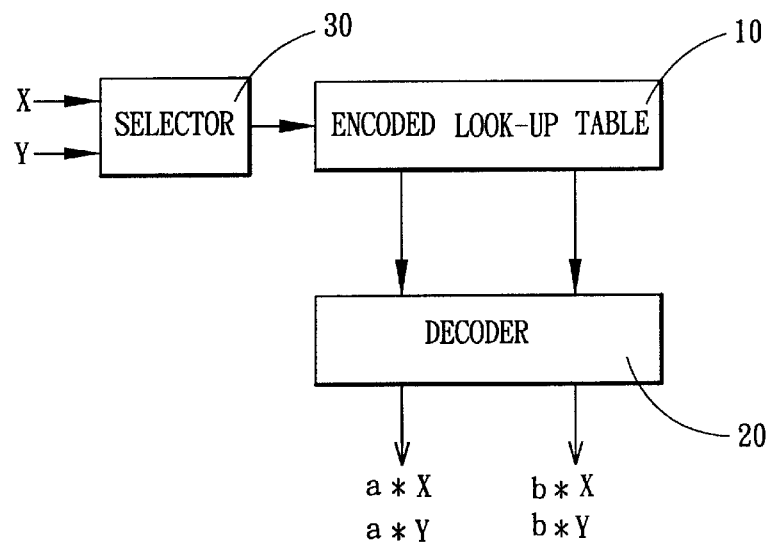
FIG. 4 is a block diagram illustrating an apparatus for performing two matrix multiplication operations associated with two different variables (X), (Y) according to the present invention.

The apparatus of the present invention should not be limited to one that is capable of performing plural matrix multiplication operations associated with only one variable (X). Referring to FIG. 4, aside from the look-up table 10 and the decoder 20, an additional selector 30, such as a multiplexer, is needed to implement plural matrix multiplication operations associated with two different variables (X) and (Y). The selector 30 is used to select either of the variables (X), (Y) for addressing the look-up table 10. The look-up table 10 can be constructed using either the DPCM coding scheme or the binary polynomial approximation coding scheme described beforehand for the results of the matrix multiplication operations a*X, b*x, a*Y, b*Y. The decoder 20 decodes the addressed products from the look-up table 10 such that the results of the matrix multiplication operations a*X, b*X can be obtained therefrom when the selector 30 selects the variable (X) to address the look-up table 10, and such that the results of the matrix multiplication operations a*Y, b*Y can be obtained therefrom when the selector 30 selects the variable (Y) to address the look-up table 10. The embodiment of FIG. 4 is suitable for implementation when the range of values of the variables (X), (Y) overlap.

Figure 5:
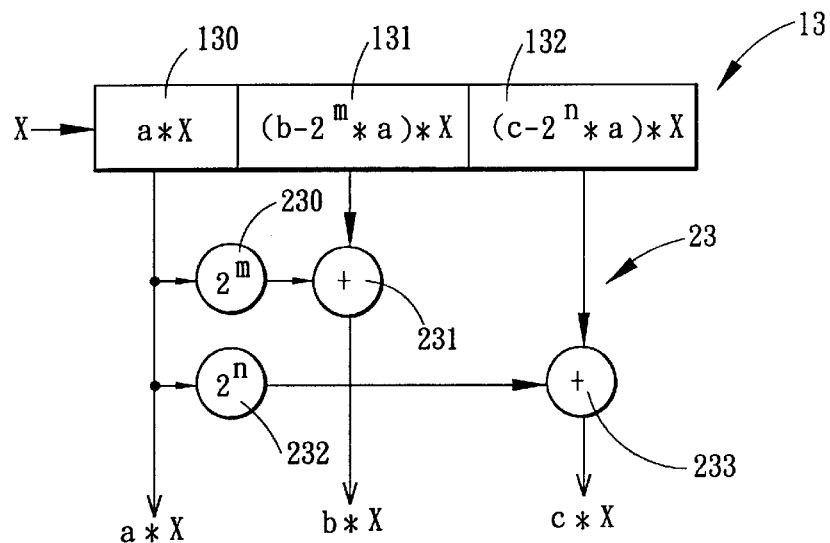
FIG. 5 is a block diagram illustrating a modified embodiment of the present invention based on the apparatus of FIG. 2.

Moreover, the apparatus of the present invention should not be limited to one that is capable of performing only two matrix multiplication operations. As shown in FIG. 5, the first preferred embodiment of FIG. 2 can be modified so as to be capable of performing three matrix multiplication operations a*X, b*X, c*X associated with a common variable (X). Each entry of the look-up table 13 has a first data field 130 for storing the product of the corresponding value of the variable (X) and the coefficient (a), a second data field 131 for storing the product of the corresponding value of the variable (X) and a differential coefficient $(b-2^m*a)*X$, and a third data field 132 for storing the product of the corresponding value of the variable (X) and a differential coefficient $(c-2^n*a)*X$. The look-up table 13 further has a first output to provide the product in the first data field 130 of an addressed one of the entries, a second output to provide the product in the second data field 131 of the addressed one of the entries, and a third output to provide the product in the third data field 132 of the addressed one of the entries when the look-up table 13 is addressed by the variable (X). The decoder 23 includes first and second shifters 230, 232 connected to the first output of the look-up table 13, a first adder 231 connected to the first shifter 230 and the second output of the look-up table 13 for obtaining the result of the matrix multiplication operation b*X, and a second adder 233 connected to the second shifter 232 and the third output of the look-up table 13 for obtaining the result of the matrix multiplication operation c*X. Particularly, the first shifter 230 shifts the result of the matrix multiplication operation a*X from the first output of the look-up table 13 by (m) bits, and provides the shifted result to the first adder 231. The first adder 231 adds the shifted result from the first shifter 230 to the addressed product $(b-2^m a)*X$ at the second output of the look-up table 13 to obtain the result of the matrix multiplication operation b*X. The second shifter 232 shifts the result of the matrix multiplication operation a*X from the first output of the look-up table 13 by (n) bits, and provides the shifted result to the second adder 233. The second adder 233 adds the shifted result from the second shifter 232 to the addressed product at the third output of the look-up table 13 to obtain the result of the matrix multiplication operation c*X.

Figure 6:
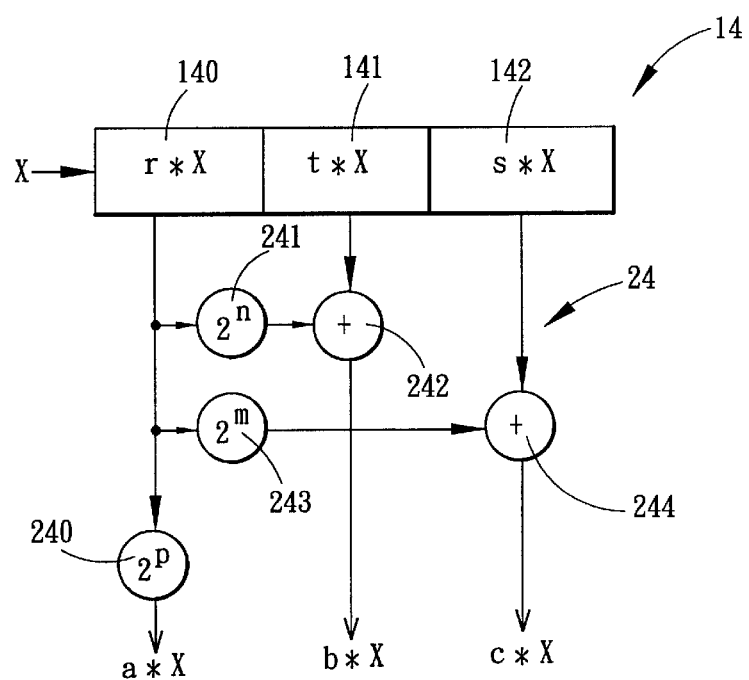
FIG. 6 is a block diagram illustrating another modified embodiment of the present invention based on the apparatus of FIG. 3.

Referring to FIG. 6, the second preferred embodiment of FIG. 3 can also be modified so as to be capable of performing three matrix multiplication operations a*X, b*X, c*X associated with a common variable (X). An appropriate value (r) is chosen such that $a=r*2^m+s$, $b=r*2^n+t$, and $c=r*2^p$, where (m), (n) and (p) are integers, and (s) and (t) are compensating remainders. As such, each entry of the look-up table 14 has a first data field 140 for storing the product of the corresponding value of the variable (X) and the coefficient (r), a second data field 141 for storing the product of the corresponding value of the variable (X) and the coefficient (t), and a third data field 142 for storing the product of the corresponding value of the variable (X) and the coefficient (s). The look-up table 14 further has a first output to provide the product in the first data field 140 of an addressed one of the entries, a second output to provide the product in the second data field 141 of the addressed one of the entries, and a third output to provide the product in the third data field 142 of the addressed one of the entries when the look-up table 14 is addressed by the variable (X). The decoder 24 includes first, second and third shifters 240, 241, 243 connected to the first output of the look-up table 14, a first adder 242 connected to the second shifter 241 and the second output of the look-up table 14 for obtaining the result of the matrix multiplication operation b*X, and a second adder 244 connected to the third shifter 243 and the third output of the look-up table 14 for obtaining the result of the matrix multplication operation a*X. Particularly, the first shifter 240 shifts the addressed product at the first output of the look-up table 14 by (p) bits to obtain the result of the matrix multiplication operation c*X. The second shifter 241 shifts the addressed product at the first output of the look-up table 14 by (n) bits, and provides the shifted result to the first adder 242. The first adder 242 adds the shifted result from the second shifter 241 to the addressed product at the second output of the look-up table 14 to obtain the result of the matrix multiplication operation b*X. The third shifter 243 shifts the addressed product at the first output of the look-up table 14 by (m) bits, and provides the shifted result to the second adder 244. The second adder 244 adds the shifted result from the third shifter 243 to the addressed product at the third output of the look-up table 14 to obtain the result of the matrix multiplication operation a*X.

Figure 7:
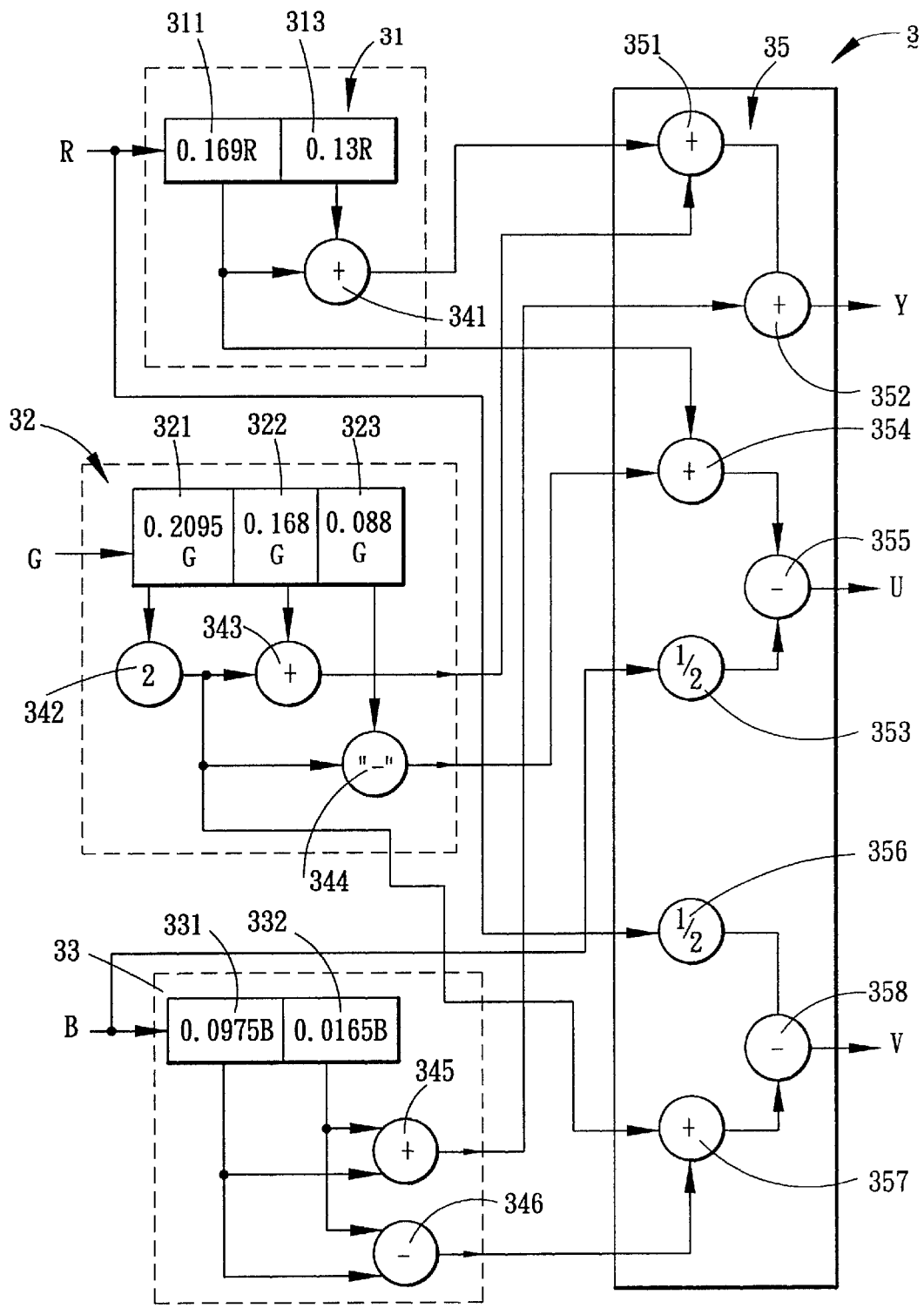
FIG. 7 is a block diagram illustrating a color space-converting device that incorporates the apparatus of this invention.

FIG. 7 illustrates a first application of the present invention. The device shown in FIG. 7 is a color space-converting device 3 for converting RGB color space signals to YUV color space signals according to the following set of conversion formulas:

$$Y=0.299R+0.587G+0.114B$$

$$U=-0.169R-0.331G+0.5B$$

$$V=0.5R-0.419G-0.081B$$

Three look-up tables 31, 32, 33 are allocated for the R, G and B signals of the original color space, respectively. The first look-up table 31 is associated with the R signal, and each entry thereof has a first data field 311 for storing the corresponding R-in-U component, i.e. 0.169R, and a second data field 312 for storing the corresponding DPCM-encoded R-in-Y component, i.e. (0.299−0.169)R or 0.13R. Because the R-in-V component is exactly one-half of the R signal, it is convenient to implement the same using an arithmetic right shifter in a succeeding combining unit 35 of the converting device 3 so as not to occupy space in the first look-up table 31. The R-in-U component for the U color space signal can be obtained directly from the first output of the first look-up table 31. An adder 341 is connected to the first and second outputs of the first look-up table 31, and serves as a first decoder to obtain the R-in-Y component for the Y color space signal.

The second look-up table 32 is associated with the G signal, and stores binary polynomial approximation-encoded G-in-Y, G-in-U and G-in-V components.

Particularly, the constants of the G-in-Y, G-in-U and G-in-V components, i.e. 0.587G, 0.331G and 0.419G, are expanded as follows:

$$0.587 = 0.2095*2 + 0.168$$
$$0.331 = 0.2095*2 - 0.088$$
$$0.419 = 0.2095*2$$

As such, each entry of the second look-up table 32 has a first data field 321 for storing a corresponding product of the matrix multiplication operation 0.2095G, a second data field 322 for storing a corresponding product of the matrix multiplication operation 0.168G, and a third data field 323 for storing a corresponding product of the matrix multiplication operation 0.088G. A second decoder associated with the second look-up table 32 includes an arithmetic left-shifter 342 connected to the first output of the second look-up table 32 to left-shift the addressed product in the first data field 321 so as to obtain the G-in-V component for the V color space signal, an adder 343 connected to the left-shifter 342 and the second output of the second look-up table 32 to add the shifted result from the left-shifter 342 to the addressed product in the second data field 322 so as to obtain the G-in-Y component for the Y color space signal, and a subtractor 344 connected to the left-shifter 342 and the third output of the second look-up table 32 to subtract the addressed product in the third data field 323 from the shifted result of the left-shifter 342 so as to obtain the G-in-U component for the U color space signal.

The third look-up table 33 is associated with the B signal, and stores mean-error encoded B-in-Y and B-in-V components. Because the B-in-U component is exactly one-half of the B signal, it is convenient to implement the same using an arithmetic right shifter in the succeeding combining unit 35 of the converting device 3 so as not to occupy space in the third look-up table 33. It is noted that the constants of the B-in-Y and B-in-V components, i.e. 0.114B and 0.081B, can be expanded into a mean value of 0.0975 and an error value of 0.0165. As such, each entry of the third look-up table 33 has a first data field 331 for storing a corresponding product of the matrix multiplication operation 0.0975B, and a second data field 332 for storing a corresponding product of the matrix multiplication operation 0.0165B. A third decoder associated with the third look-up table 33 includes an adder 345 connected to the first and second outputs of the third look-up table 33 for adding the addressed products in the first and second data fields 331, 332 so as to obtain the B-in-Y component for the Y color space signal, and a subtractor 346 connected to the first and second outputs of the third look-up table 33 for generating the difference between the addressed products in the first and second data fields 331, 332 so as to obtain the B-in-V component for the V color space signal.

The combining unit 35 includes first and second adders 351, 352 for adding together the R-in-Y component, the G-in-Y component and the B-in-Y component to obtain the Y color space signal. The combining unit 35 further includes a first arithmetic right shifter 353 to obtain the B-in-U component for the U color space signal, and a third adder 354 and a first subtracter 355 for combining the R-in-U component, the G-in-U component and the B-in-U component to obtain the U color space signal. The combining unit 35 additionally includes a second arithmetic right shifter 356 to obtain the R-in-V component for the V color space signal, and a fourth adder 357 and a second subtracter 358 for combining the R-in-V component, the G-in-V component and the B-in-V component to obtain the V color space signal.

Figure 8:
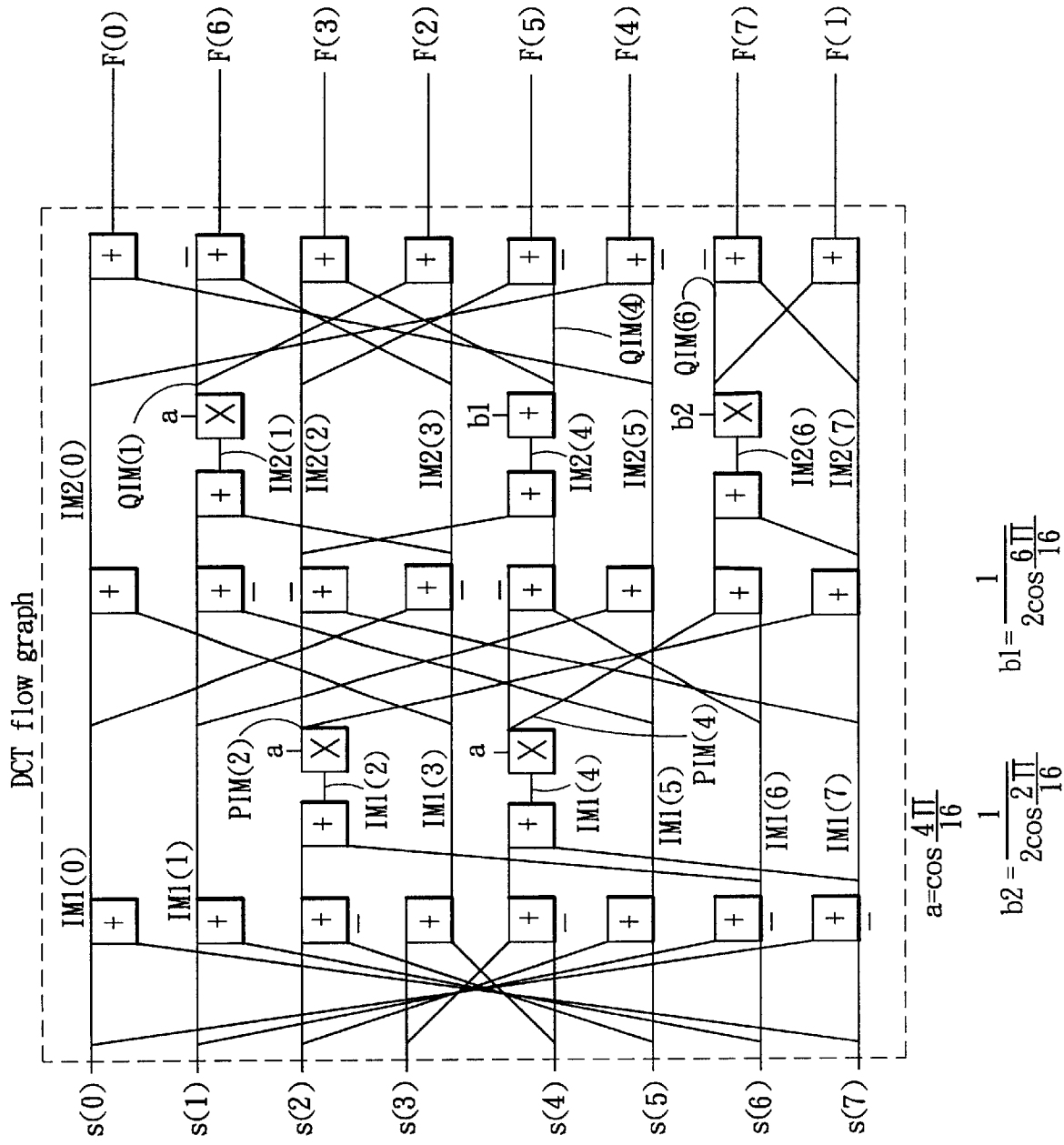
FIG. 8 is a flow graph of a conventional discrete cosine transform (DCT) fast algorithm.
Figure 9:
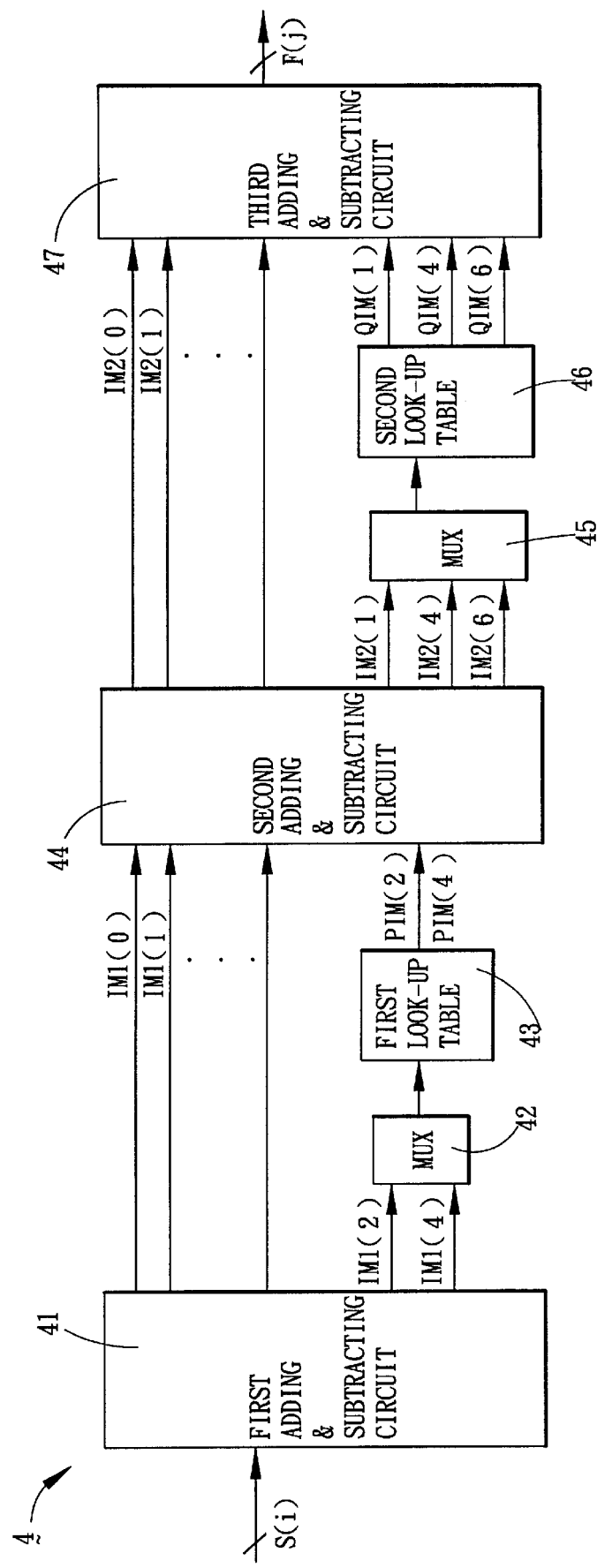
FIG. 9 is a block diagram illustrating a DCT device that incorporates the apparatus of this invention.
Figure 10:
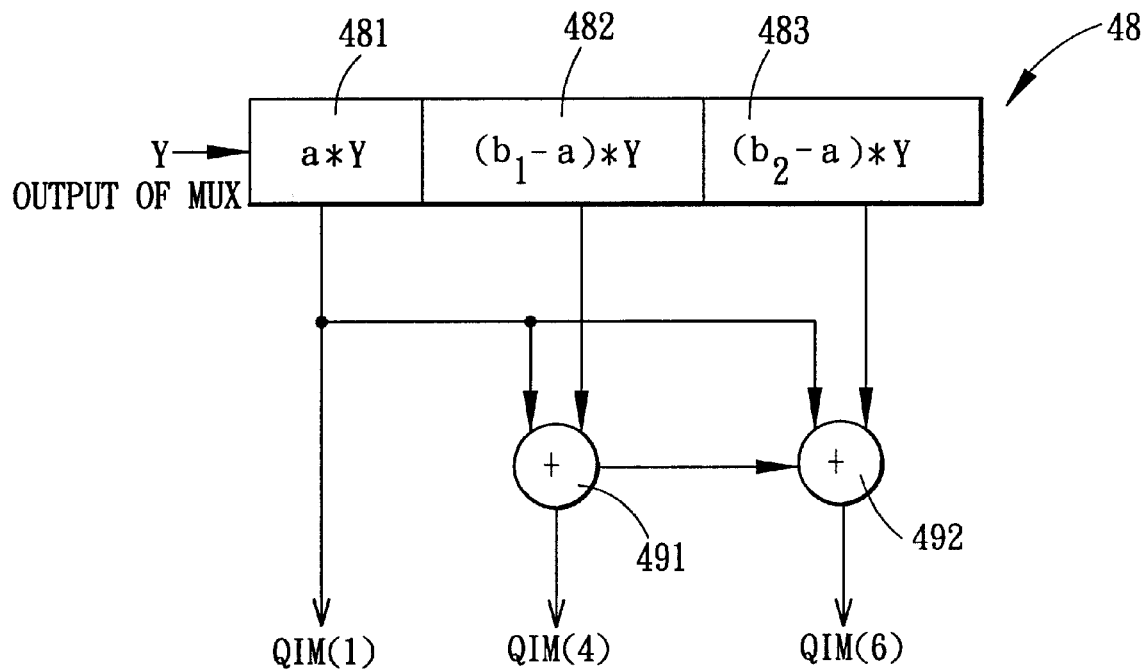
FIG. 10 is a block diagram illustrating the apparatus for performing plural matrix multiplication operations to be employed in the DCT device of FIG. 9 according to this invention.

FIGS. 8, 9 and 10 show a second application of the present invention to illustrate how plural matrix multiplication operations associated with different variables can share a single look-up table. FIG. 8 shows a flow graph of a conventional discrete cosine transform (DCT) fast algorithm. There are five matrix multiplication operations, each of which is associated with a definite coefficient. The five matrix multiplication operations are implemented using two look-up tables, as shown in the DCT device 4 of FIG. 9. Referring to FIG. 9, input data s(i), where (i)=0 to 7, is received by a first adding and subtracting circuit 41 of the DCT device 4 for performing addition and subtraction operations according to the DCT fast algorithm to generate a set of first intermediate results IM1(i), where (i)=0 to 7. The first intermediate results IM1(2) and IM1(4) are directed to a multiplexer 42 of the DCT device 4, and are selected at the appropriate time to address a first look-up table 43. The first look-up table 43 is used to implement two multiplication operations having the same coefficient (a), i.e. a*IM1(2) and a*IM1(4), and provides either of the results PIM(2) and PIM(4) of the two multiplication operations at the output thereof each time the first look-up table 43 is addressed by the multiplexer 42. The results PIM(2) and PIM(4), as well as the other first intermediate results IM1(i), where (i)=0, 1, 3, 5, 6, 7, serve as inputs to a second adding and subtracting circuit 44 of the DCT device 4 for performing addition and subtraction operations according to the DCT fast algorithm to generate a set of second intermediate results IM2(i), where (i)=0 to 7. The second intermediate results IM2(1), IM2(4) and IM2(6) are directed to a multiplexer 45 of the DCT device 4, and are selected at the appropriate time to address a second look-up table 46. The second look-up table 46 is used to implement three multiplication operations having three different coefficients (a), (b1) and (b2), i.e. a*IM2(1), b1*IM2(4) and b2*IM2(6) and provides the results QIM(1), QIM(4) and QIM(6) of the three multiplication operations at the outputs thereof whenever the second look-up table 46 is addressed by the multiplexer 45. The results QIM(1), QIM(4) and QIM(6), as well as the other second intermediate results IM2(i), where (i)=0, 2, 3, 5, 7, serve as inputs to a third adding and subtracting circuit 47 of the DCT device 4 for performing addition and subtraction operations according to the DCT fast algorithm to generate transformed results F(j), where (j)=0 to 7, corresponding to the input data s(i). Because the first look-up table 43 implements two multiplication operations having the same coefficient, only one set of pre-calculated products a*X, where X=IM1(2) or IM1(4), is needed for storage therein. The first look-up table 43 is addressed by the first intermediate results IM1(2) and IM1(4) using a time sharing scheme via the multiplexer 42. The first look-up table 43 need not incorporate any coding algorithm as proposed in the present invention. On the other hand, the second look-up table 46 is used to perform three multiplication operations with different coefficients, and can be implemented using a coded look-up table together with an associated decoder according to this invention. FIG. 10 is a block diagram illustrating an apparatus for performing three matrix multiplication operations to be employed in the DCT device 4 of FIG. 9. Each entry of a DPCM-encoded look-up table 48 has first, second and third data fields 481, 482, 483 for storing respectively corresponding products a*Y, (b1−a)*Y and (b2−a)*Y, where Y is IM2(1), IM2(4) or IM2(6) according to the output of the multiplexer 45 (see FIG. 9) at the appropriate time. The result QIM(1) is obtained directly from the first output of the look-up table 48 when the intermediate H) result IM2(1) is selected to address the table 48. The decoder associated with the look-up table 48 includes a first adder 491 for adding the result at the first output of the look-up table 48 to the addressed product (b1−a)*IM2(4) at the second output of the look-up table 48 to obtain the result QIM(4) when the intermediate result IM2(4) is selected to address the look-up table 48, and a second adder 492 for adding the result at the first output of the look-up table 48 to the addressed product (b2−a)*IM2(6) at the third output of the look-up table 48 to obtain the product QIM(6) when the intermediate result IM2(6) is selected to address the look-up table 48. As such, the apparatus provides the results QIM(1), QIM(4), QIM(6) at appropriate times according to the output of the multiplexer 45.

It should be noted that, although the preferred embodiments have been shown and described to be in the form of hardwired blocks in a dedicated hardware circuitry, the present invention can be easily and efficiently implemented using a programmed microcomputer having a microprocessor and associated system memory.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for performing plural matrix multiplication operations, a first one of the matrix multiplication operations being performed to obtain a product of a first coefficient (a) and a first variable (X), a second one of the matrix multiplication operations being performed to obtain a product of a second coefficient (b) and the first variable (X), the method comprising the steps of:

constructing a look-up table having a plurality of entries, each of the entries corresponding to a value a of the first variable (X) and having a first data field that stores the product of the corresponding value of the first variable (X) and the first coefficient (a), and a second data field that stores the product of the corresponding value of the first variable (X) and a differential coefficient (b−$2^m$a), where m is an integer;

providing the first variable (X) to the look-up table to address a corresponding one of the entries such that the product in the first data field of the corresponding one of the entries is generated at a first output of the look-up table, and such that the product in the second data field of the corresponding one of the entries is generated at a second output of the look-up table;

obtaining result of the first one of the matrix multiplication operations from the first output of the look-up table when the first variable (X) is used to address the look-up table; and combining the products at the first and second outputs of the look-up table to obtain result of the second one of the matrix multiplication operations when the first variable (X) is used to address the look-up table.

2. The method as claimed in claim 1, wherein the step of combining the products at the first and second outputs of the look-up table includes:

shifting the product at the first output of the look-up table by m bits to generate a shifted result; and adding the shifted result to the product at the second output of the look-up table.

3. The method as claimed in claim 1, a third one of the matrix multiplication operations being performed to obtain a product of the first coefficient (a) and a second variable (Y), a fourth one of the matrix multiplication operations being performed to obtain a product of the second coefficient (b) and the second variable (Y), the method further comprising the step of:

selecting one of the first and second variables (X) (Y) to address the look-up table, each of the entries of the look-up table further corresponding to a value of the second variable (Y) such that result of the third one of the matrix multiplication operations is obtained from the first output of the look-up table when the second variable (Y) is selected to address the look-up table, and such that result of the fourth one of the matrix multiplication operations is obtained after combining the products at the first and second outputs of the look-up table when the second variable (Y) is selected to address the look-up table.

4. An apparatus for performing plural matrix multiplication operations, a first one of the matrix multiplication operations being performed to obtain a product of a first coefficient (a) and a first variable (X), a second one of the matrix multiplication operations being performed to obtain a product of a second coefficient (b) and the first variable (X), said apparatus comprising:

a look-up table having a plurality of entries, each of the entries corresponding to a value of the first variable (X) and having a first data field that stores the product of the corresponding value of the first variable (X) and the first coefficient (a), and a second data field that stores the product of the corresponding value of the first variable (X) and a differential coefficient (b−$2^m$a), where m is an integer, said look-up table being adapted to receive the first variable (X) and having a first output to provide the product in the first data field of one of the entries that is addressed by the first variable (X), and a second output to provide the product in the second data field of said one of the entries that is addressed by the first variable (X), result of the first one of the matrix multiplication operations being obtained from the first output of said look-up table when the first variable (X) is used to address said look-up table; and a decoder connected to the first and second outputs of said look-up table, said decoder combining the products at the first and second outputs of said look-up table to obtain result of the second one of the matrix multiplication operations when the first variable (X) is used to address said look-up table.

5. The apparatus as claimed in claim 4, wherein said decoder includes:

a shifter connected to the first output of said look-up table for shifting the product at the first output of said look-up table by m bits to generate a shifted result; and an adder connected to said shifter and the second output of said look-up table for adding the shifted result from said shifter to the product at the second output of said look-up table.

6. The apparatus as claimed in claim 4, a third one of the matrix multiplication operations being performed to obtain a product of the first coefficient (a) and a second variable (Y), a fourth one of the matrix multiplication operations being performed to obtain a product of the second coefficient (b) and the second variable (Y), said apparatus further comprising:

a selector connected to said look-up table and adapted to select one of the first and second variables (X), (Y) to address said look-up table, each of the entries of the look-up table further corresponding to a value of the second variable (Y) such that result of the third one of the matrix multiplication operations is obtained from the first output of the look-up table when the second variable (Y) is selected to address said look-up table, and such that result of the fourth one is of the matrix multiplication operations is obtained after combining the products at the first and second outputs of said look-up table when the second variable (Y) is selected to address said look-up table.

7. A method for performing plural matrix multiplication operations, a first one of the matrix multiplication operations being performed to obtain a product of a first coefficient (a) and a first variable (X), a second one of the matrix multiplication operations being performed to obtain a product of a second coefficient (b) and the first variable (X), the method comprising the steps of: constructing a look-up table having a plurality of entries, each of the entries corresponding to a value of the first variable (X) and having a first data field that stores the product of the corresponding value of the first variable (X) and a third coefficient (r), and a second data field that stores the product of the corresponding value of the first variable (X) and a fourth coefficient (c), where $a=r*2^m+c$, and $b=r*2^n$, and m and n are integers;

providing the first variable (X) to the look-up table to address a corresponding one of the entries such that the product in the first data field of the corresponding one of the entries is generated at a first output of the look-up table, and such that the product in the second data field of the corresponding one of the entries is generated at a second output of the look-up table; and processing the products at the first and second outputs of the look-up table to obtain results of the first and second ones of the matrix multiplication operations when the first variable (X) is used to address the look-up table.

8. The method as claimed in claim 7, wherein the step of processing the products at the first and second outputs of the look-up table includes:

shifting the product at the first output of the look-up table by n bits to obtain the result of the second one of the matrix multiplication operations;

shifting the product at the first output of the look-up table by m bits to generate a shifted result; and adding the shifted result to the product at the second output of the look-up table to obtain the result of the first one of the matrix multiplication operations.

9. The method as claimed in claim 7, a third one of the matrix multiplication operations being performed to obtain a product of the first coefficient (a) and a second variable (Y), a fourth one of the matrix multiplication operations being performed to obtain a product of the second coefficient (b) and the second variable (Y), the method further comprising the step of:

selecting one of the first and second variables (X), (Y) to address the look-up table, each of the entries of the look-up table further corresponding to a value of the second variable (Y) such that results of the third and fourth ones of the matrix multiplication operations are obtained after processing the products at the first and second outputs of the look-up table when the second variable (Y) is selected to address the look-up table.

10. An apparatus for performing plural matrix multiplication operations, a first one of the matrix multiplication operations being performed to obtain a product of a first coefficient (a) and a first variable (X), a second one of the matrix multiplication operations being performed to obtain a product of a second coefficient (b) and the first variable (X), said apparatus comprising:

a look-up table having a plurality of entries, each of the entries corresponding to a value of the first variable (X) and having a first data field that stores the product of the corresponding value of the first variable (X) and a third coefficient (r), and a second data field that stores the product of the corresponding value of the first variable (X) and a fourth coefficient (c), where $a=r*2^m+c$ and $b=r*2^n$, and m and n are integers, said look-up table being adapted to receive the first variable (X) and having a first output to provide the product in the first data field of one of the entries that is addressed by the first variable (X), and a second output to provide the product in the second data field of said one of the entries that is addressed by the first variable (X); and a decoder connected to the first and second outputs of said look-up table, said decoder processing the products at the first and second outputs of said look-up table to obtain results of the first and second ones of the matrix multiplication operations when the first variable (X) is used to address said look-up table.

11. The apparatus as claimed in claim 10, wherein said decoder includes:

a first shifter connected to the first output of said look-up table for shifting the product at the first output of said look-up table by n bits to obtain the result of the second one of the matrix multiplication operations;

a second shifter connected to the first output of said look-up table for shifting the product at the first output of said look-up table by m bits to generate a shifted result; and an adder connected to said second shifter and said second output of said look-up table for adding the shifted result from said second shifter to the product at the second output of said look-up table to obtain the result of the first one of the matrix multiplication operations.

12. The apparatus as claimed in claim 10, a third one of the matrix multiplication operations being performed to obtain a product of the first coefficient (a) and a second variable (Y), a fourth one of the matrix multiplication operations being performed to obtain a product of the second coefficient (b) and the second variable (Y), said apparatus further comprising:

a selector connected to said look-up table and adapted to select one of the first and second variables (X), (Y) to address said look-up table, each of the entries of said look-up table further corresponding to a value of the second variable (Y) such that results of the third and fourth ones of the matrix multiplication operations are obtained after processing the products at the first and second outputs of said look-up table when the second variable (Y) is selected to address said look-up table.

* * * * *